United States Patent [19]

Hirozawa et al.

[11] Patent Number: 5,230,819
[45] Date of Patent: Jul. 27, 1993

[54] DIPHOSPHONATES AS CORROSION INHIBITORS FOR ANTIFREEZE COOLANTS AND OTHER FUNCTIONAL FLUIDS

[75] Inventors: Stanley T. Hirozawa, Bloomfield; David E. Turcotte; Michael C. Welch, both of Woodhaven, all of Mich.

[73] Assignee: BASF Corp., Parsippany, N.J.

[21] Appl. No.: 784,846

[22] Filed: Oct. 30, 1991

[51] Int. Cl.$^5$ ............... C09K 5/00; C23F 11/167
[52] U.S. Cl. .................. 252/78.5; 252/75; 252/389.23; 422/7; 422/15
[58] Field of Search .......... 252/78.5, 75, 389.23, 252/389.2; 422/7, 15

[56] References Cited

U.S. PATENT DOCUMENTS

| | | | |
|---|---|---|---|
| 3,855,284 | 12/1974 | Germscheid | 260/502.4 |
| 3,935,125 | 1/1976 | Jacob | 252/389 |
| 4,101,441 | 7/1978 | Hwa et al. | 252/181 |
| 4,329,243 | 5/1982 | Diebel | 252/76 |
| 4,613,450 | 9/1986 | Moran et al. | 252/181 |
| 4,707,286 | 11/1987 | Carr | 252/75 |
| 4,904,413 | 2/1990 | Hoots et al. | 252/180 |
| 5,000,916 | 3/1991 | Vukasovich et al. | 422/14 |
| 5,118,434 | 6/1992 | Meyer et al. | 252/75 |

FOREIGN PATENT DOCUMENTS 222600 5/1985 German Democratic Rep. .

Primary Examiner—Christine Skane

[57] ABSTRACT

A coolant or antifreeze composition has one or more glycols or glycol ethers in combination with water, one or more additives, and an effective amount of 1-hydroxyoctylidene-1,1-diphosphonic acid or 1-hydroxydodecylidene-1,1-diphosphonic acid as a corrosion inhibitor.

15 Claims, 5 Drawing Sheets

DIPHOSPHONATES AS CORROSION INHIBITORS FOR ANTIFREEZE COOLANTS AND OTHER FUNCTIONAL FLUIDS

FIELD OF THE INVENTION

The present invention relates to the use of 1-hydroxyoctylidene-1,1-diphosphonic acid and 1-hydroxydodecylidene-1,1-diphosphonic acid as corrosion inhibitors for metal, and also to coolant compositions, and more specifically to coolant compositions comprising 1-hydroxyoctylidene-1,1-diphosphonic acid or 1-hydroxydodecylidene-1,1-diphosphonic acid as corrosion inhibitors.

BACKGROUND OF THE INVENTION

The use of aluminum parts in the automotive industry is now well established. Aluminum radiators, heaters, water pumps and engines are found in many late model passenger cars and other automotive vehicles. Most coolant or antifreeze compositions for use in such coolant systems contain one or more corrosion inhibitors. These corrosion inhibitors are utilized to prevent the deterioration of the aluminum and other metals in contact with the antifreeze.

Presently, perhaps the most cost effective corrosion inhibitor for aluminum is silicate. There are numerous patents and publications directed to the use of silicate as a corrosion inhibitor in coolant compositions. However, silicate is very pH sensitive and has a tendency to gel irreversibly. Thus, there have been many reported instances of deposits "dropping out" of coolants with high silicate levels. Silicate is also alleged to be somewhat aggressive on some foreign-made water pumps.

Several attempts have been made at stabilizing coolant compositions so as to prevent the fall out of gelled deposits. Various siloxanes have been proposed for this purpose.

1-hydroxyethylidene-1,1-diphosphonic acid or HEDPA is known in the art as a corrosion inhibitor for mild steel, and is currently available from Monsanto under the trademark DEQUEST (R) 2010. HEDPA may be prepared according to the following reaction:

$$RCOOH + 2PCl_3 + 5H_2O \rightarrow RC(PO_3H_2)_2(OH) + 6HCl$$

where $R=C_1$.

HEDPA has been shown to be rather aggressive against aluminum.

Other patents also relate to the use of phosphate compounds to prevent corrosion in aluminum and other metal-based systems containing coolant formulations. Carr, U.S. Pat. No. 4,707,286, relates to the use of certain organic phosphonate compounds and certain organic silicon compounds as stabilizers for coolant compositions.

Moran et al., U.S. Pat. No. 4,613,450, discloses corrosion inhibitors for protecting metallic surfaces which come into contact with water. The primary constituent of these corrosion inhibitors are fluorophosphate compounds.

Vukasovich et al., U.S. Pat. No. 5,000,916, is directed to the use of a molybdenum carboxylic compound and the use thereof as a corrosion inhibitor of steel and other metals in cooling water.

Jacob, U.S. Pat. No. 3,935,125, relates to a method and composition for inhibiting corrosion in aqueous systems, the composition including a mixture of amine pyrophosphate, an organophosphonate, and triazole.

A new class of compounds has now surprisingly been found to be extremely effective in controlling corrosive build-up on aluminum and other metals such as copper, brass, steel and solder. These compounds are 1-hydroxyoctylidene-1,1-diphosphonic acid (HODPA) and 1-hydroxydodecylidene-1,1-diphosphonic acid (HDDPA), and may be derived from the above reaction formula where $R=C_7$ and $R=C_{11}$, respectively. Accordingly, preferred starting materials include octanoic and dodecanoic acids, respectively. To date it is believed that neither HODPA nor HDDPA has been successfully utilized as a corrosion inhibitor in coolant compositions.

OBJECTS OF THE INVENTION

It is therefore an object of the present invention to provide for the use of 1-hydroxyoctylidene-1,1-diphosphonic acid and 1-hydroxydodecylidene-1,1-diphosphonic acid as corrosion inhibitors in coolant compositions for aluminum, copper, brass, solder, mild steel, cast iron and other metals.

It is also an object of the present invention to provide a coolant composition which comprises an effective amount of 1-hydroxyoctylidene-1,1-diphosphonic acid as a corrosion inhibitor.

It is also an object of the present invention to provide a coolant composition which comprises an effective amount of 1-hydroxydodecylidene-1,1-diphosphonic acid as a corrosion inhibitor.

A further object of the present invention is to provide a method of inhibiting corrosion utilizing 1-hydroxyoctylidene-1,1-diphosphonic acid.

Still another object of the invention is to provide a method of inhibiting corrosion utilizing 1-hydroxydodecylidene-1,1-diphosphonic acid.

Yet another object of the invention is to provide an ethylene glycol based antifreeze formulation which comprises an effective amount of 1-hydroxyoctylidene-1,1-diphosphonic acid or 1-hydroxydodecylidene-1,1-diphosphonic acid as a corrosion inhibitor.

SUMMARY OF THE INVENTION

The present invention provides for the use of 1-hydroxyoctylidene-1,1-diphosphonic acid and 1-hydroxydodecylidene-1,1-diphosphonic acid as corrosion inhibitors for metals, especially aluminum.

Other objects of the invention are achieved by providing a coolant composition effective in inhibiting metal corrosion which comprises one or more glycols or glycol ethers and an effective amount of 1-hydroxyoctylidene-1,1-diphosphonic acid or 1-hydroxydodecylidene-1,1-diphosphonic acid. In one preferred embodiment of the invention, the glycol is ethylene glycol.

Also included as part of the invention is a coolant composition which comprises ethylene glycol, sodium nitrate, borax, and water, and an effective amount of 1-hydroxyoctylidene-1,1-diphosphonic acid or 1-hydroxydodecylidene-1,1-diphosphonic acid as a corrosion inhibitor. In another embodiment of the invention, 1-hydroxyoctylidene-1,1-diphosphonic acid is included in an antifreeze formulation comprising ethylene glycol and dipotassium phosphate and water.

The method of inhibiting metal corrosion in coolant systems according to the invention will comprise adding an effective amount of 1-hydroxyoctylidene-1,1- diphosphonic acid or 1-hydroxydodecylidene-1,1-diphosphonic acid to a coolant composition.

Figure 1A:
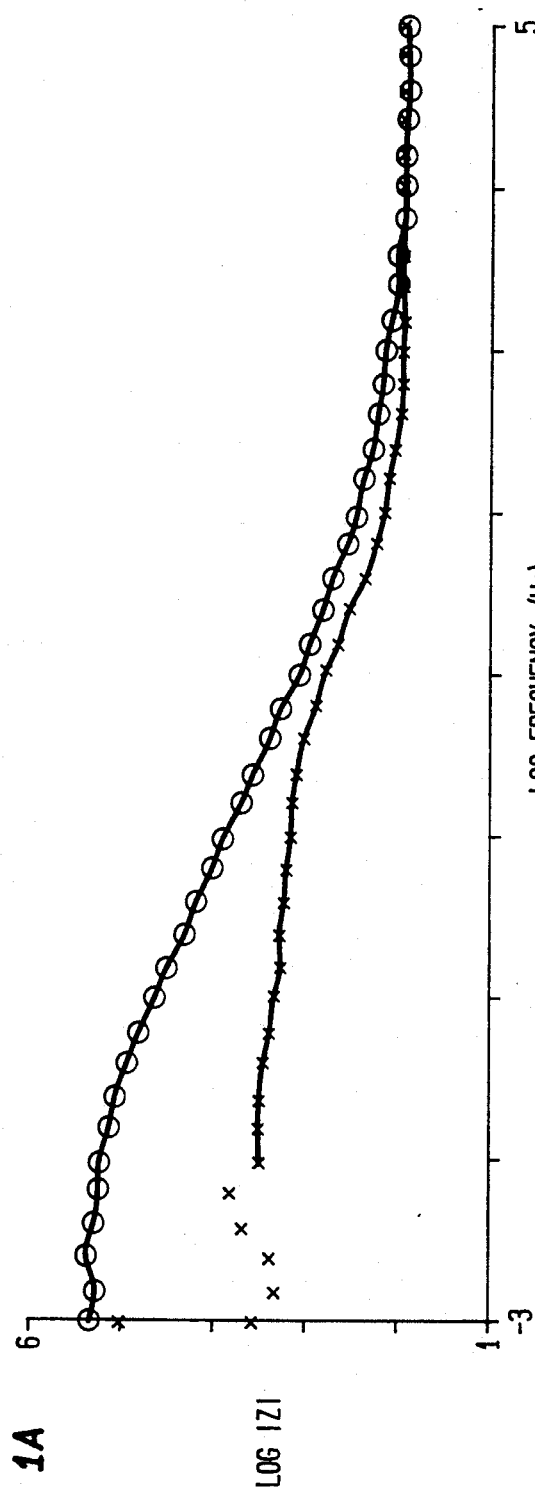
FIG. 1A and FIG. 1B are bode plots for Al in a reference base antifreeze formulation and in HDDPA.

DETAILED DESCRIPTION OF THE PREFERRED EMBODIMENTS 1-hydroxyoctylidene-1,1-diphosphonic acid and 1-hydroxydodecylidene-1,1-diphosphonic acid have been found to be extremely useful in inhibiting corrosion. 1-hydroxyoctylidene-1,1-diphosphonic acid (hereinafter HODPA) and 1-hydroxydodecylidene-1,1-diphosphonic acid (hereinafter HDDPA) may be synthesized in accordance with the procedures set forth in Germscheid, U.S. Pat. No. 3,855,284, which is incorporated in its entirety herein by reference. When alkyl carboxylic acids are reacted with $PCl_3$ and water, the following reaction occurs:

$$RCOOH + 2PCl_3 + 5H_2O \rightarrow RC(PO_3H_2)_2(OH) + 6HCl$$

When $R = C_1$, the product is 1-hydroxyethylidene-1,1-diphosphonic acid, or HEDPA. The $R = C_7$ sample may be derived from octanoic acid to yield the product HODPA. The $R = C_{11}$ sample is derived from dodecanoic acid to produce the product HDDPA. HODPA and HDDPA have the following structural formula:

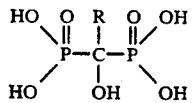

wherein R is the alkyl group having one carbon atom less than the carboxylic acid used in the above reaction.

When HODPA and HDDPA are added to coolant compositions, these compounds have shown excellent utility in inhibiting corrosion and buildups on aluminum, copper, brass, solder, mild steel and cast iron, and their alloys. Those skilled in the art will also recognize that other metals and alloys requiring corrosion protection are also within the scope of the invention.

The term "coolant" or "antifreeze" composition is used interchangeably herein and refers to those formulations which are typically added to engine radiators and internal combustion engines and other functional fluid systems to maintain operating temperatures at safe levels, and to prevent freezing and overheating and subsequent breakdown. The corrosion inhibitors HODPA and HDDPA of the present invention are preferably utilized in those coolant compositions for use in automotive vehicle radiators which comprise as their major component one or more glycols or glycol ethers. The glycol or glycol ethers that can be used in coolants include ethylene glycol, diethylene glycol, propylene glycol, dipropylene glycol, the methyl, ethyl, propyl or butyl ethers of these glycols, and the methyl and ethyl diethers of ethylene glycol, diethylene glycol, or dipropylene glycol, as well as mixtures thereof.

Especially preferred for use with the present invention is the coolant ethylene glycol, either alone or in combination with water. A typical formulation may comprise about 40–70%, preferably about 45–55%, and most preferably about 50% ethylene glycol in combination with water, or water and one or more additives. (Unless otherwise stated, all percentages expressed herein are set forth in terms of total weight of the composition.) HODPA may be added to any of these ethylene glycol formulations in an amount of from about 0.1–0.5%, preferably from about 0.1–0.2%. In another embodiment of the invention, HDDPA is added to any of the aforementioned ethylene glycol compositions in an amount of from about 0.01–0.05%, preferably from about 0.02–0.04%. One especially preferred embodiment of the present invention will comprise about 50% ethylene glycol in combination with from about 0.01–0.05%, preferably from 0.02–0.04% HDDPA, the balance of the composition being water.

The coolant formulations of the present invention may also comprise one or more coolant additives. These additives are utilized to maintain pH, prevent foaming, dye the coolant, control scale, provide reserve alkalinity, enhance cavitation resistance, enhance corrosion inhibition or modify taste or smell. Two additives which may be found in coolant compositions include sodium nitrate ($NaNO_3$) and borax $5H_2O$. Sodium nitrate is added to maintain the inner layer, while borax is added as a buffer and to provide reserve alkalinity. Typically, sodium nitrate is added in an amount of from about 0.1–1%, preferably about 0.2–0.5%, and most preferably about 0.25%. Borax is utilized in an amount of from about 0.1–1%, preferably from about 0.25–0.75%, and most preferably about 0.5%.

One especially desirable coolant composition will therefore comprise about 50% ethylene glycol, about 0.25% sodium nitrate, and about 0.5% borax. To this formulation may be added HODPA in amounts ranging from about 0.1–0.5%, preferably from about 0.1–0.2%, with the balance being water. While HDDPA in relatively low concentrations of about 0.01–0.5% in combination with a 50% ethylene glycol, 0.25% sodium nitrate and 0.5% borax formulation has been found to be extremely effective at inhibiting corrosion in the aforementioned ranges, those skilled in the art may find that certain solubility problems may require some adjusting for optimal results.

In another embodiment of the invention, ethylene glycol and water together with dipotassium phosphate ($K_2HPO_4$) will comprise a preferred coolant composition to which HODPA may be added. This composition will comprise from about 40–70% ethylene glycol, preferably from about 45–55%, and most preferably 50%, in combination with from about 0.1–1% dipotassium phosphate, preferably from about 0.25–0.75%, and most preferably about 0.5%. To any of these compositions will be added from about 0.075–0.5%, and preferably from 0.15–0.25% of the HODPA. A especially preferred formulation will therefore comprise about 50% ethylene glycol, about 0.5% dipotassium phosphate, and about 0.15–0.25% of HODPA.

Those skilled in the art may discover that higher or lower concentrations of HODPA and HDDPA will prove especially efficacious in the aforementioned compositions at inhibiting corrosion on various metals. The concentration of these polyphosphonates necessary to adequately inhibit corrosion is believed to be dependent on the structure, and the particular alloy, as well as on the medium utilized. A longer alkyl group should possibly increase the hydrophobicity and decrease the solubility of their salts, hence necessitating a lower concentration. Electrolytes in general tend to lower the critical hemimicelle concentration, possibly due to the salting out effect.

While the main application of HODPA and HDDPA will be in coolant compositions, it is also expected that these compounds will also be effective in other functional fluids, e.g., hydraulic fluids, metal cutting fluids, boilers, etc. Since these compounds appear to lay down a waxy layer on all of the metals utilized herein, they are also promising as lubricants for cutting down frictional wear, for example in the water pump in automobiles.

The method of inhibiting corrosion on metallic surfaces in coolant systems according to the invention will comprise adding an effective amount of HODPA or HDDPA to the coolant system. The HODPA or HDDPA may be added to a coolant composition according to any of the embodiments heretofore set forth. The coolant composition(s) will in turn be added to a coolant system, for example, automotive vehicle radiator, as well as to other functional fluid systems, including hydraulic fluid systems.

EXAMPLES

The following examples will help to illustrate the invention, but in no way should be construed as limiting the scope thereof:

The corrosion rate $i_{corr}$ can be determined using the following equations:

$$R_p = B/i_{corr}$$

$$B = b_a b_c / 2.3(b_a + b_c)$$

The $R_p$ obtained from EIS data is seen to be inversely proportional to the corrosion rate, i.e., the higher the $R_p$, the lower the corrosion rate. $b_a + b_c$ are the anodic and cathodic Tafel constants, respectively.

EXAMPLE 1

Figure 1B:
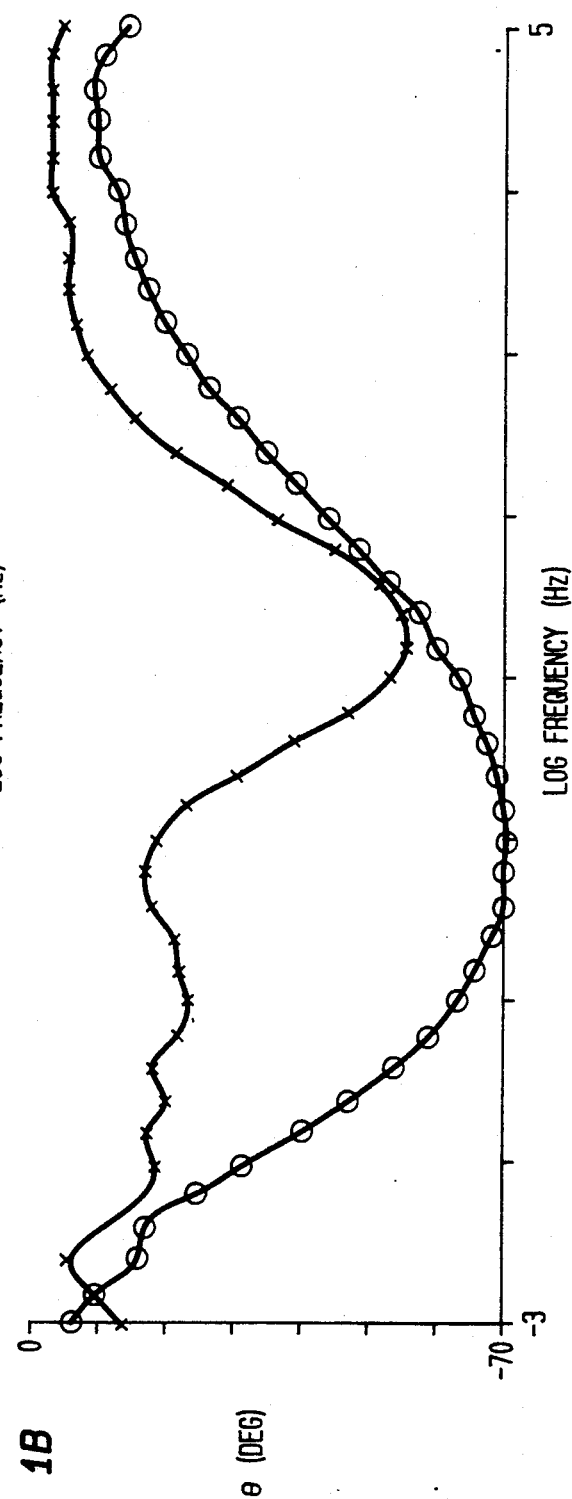

FIG. 1 and FIG. 1B give the Bode plots for Al in a reference base antifreeze formulation (BAF2) (X's) according to one embodiment of the invention versus the Bode plot for the same formulation containing 0.005% HDDPA (circles). BAF2 comprises approximately 50% ethylene glycol, 0.25% sodium nitrate, 0.5% borax . 5H$_2$O, with the balance being water.

The BAF2 spectra are noisy and manifests two time constants which indicates that BAF2 prevents the formation of a protective layer.

The polarization resistance ($R_p$) is obtained by subtracting the solution resistance ($R_s$) given by the plateau at high frequencies from the total resistance ($R_t$) given by the plateau at low frequencies. $R_p$ for HDDPA is about 2 decades higher than that for BAF2. Therefore, HDDPA has inhibited the corrosion rate of Al a hundredfold relative to BAF2.

EXAMPLE 2

Figure 2A:
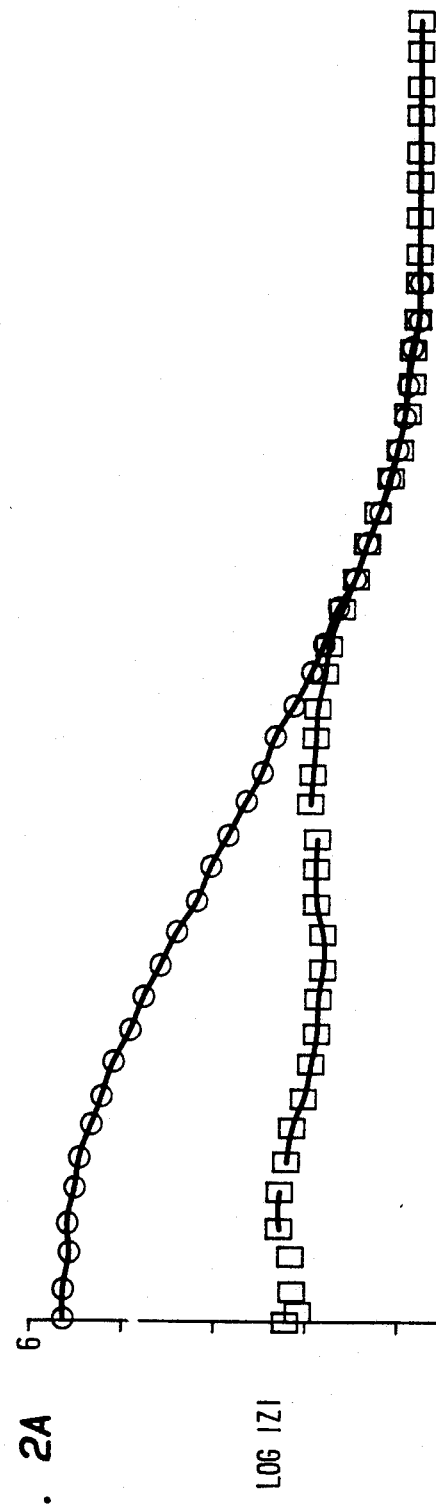
FIG. 2A and FIG. 2B are Bode plots for HDDPA and HEDPA.
Figure 2B:
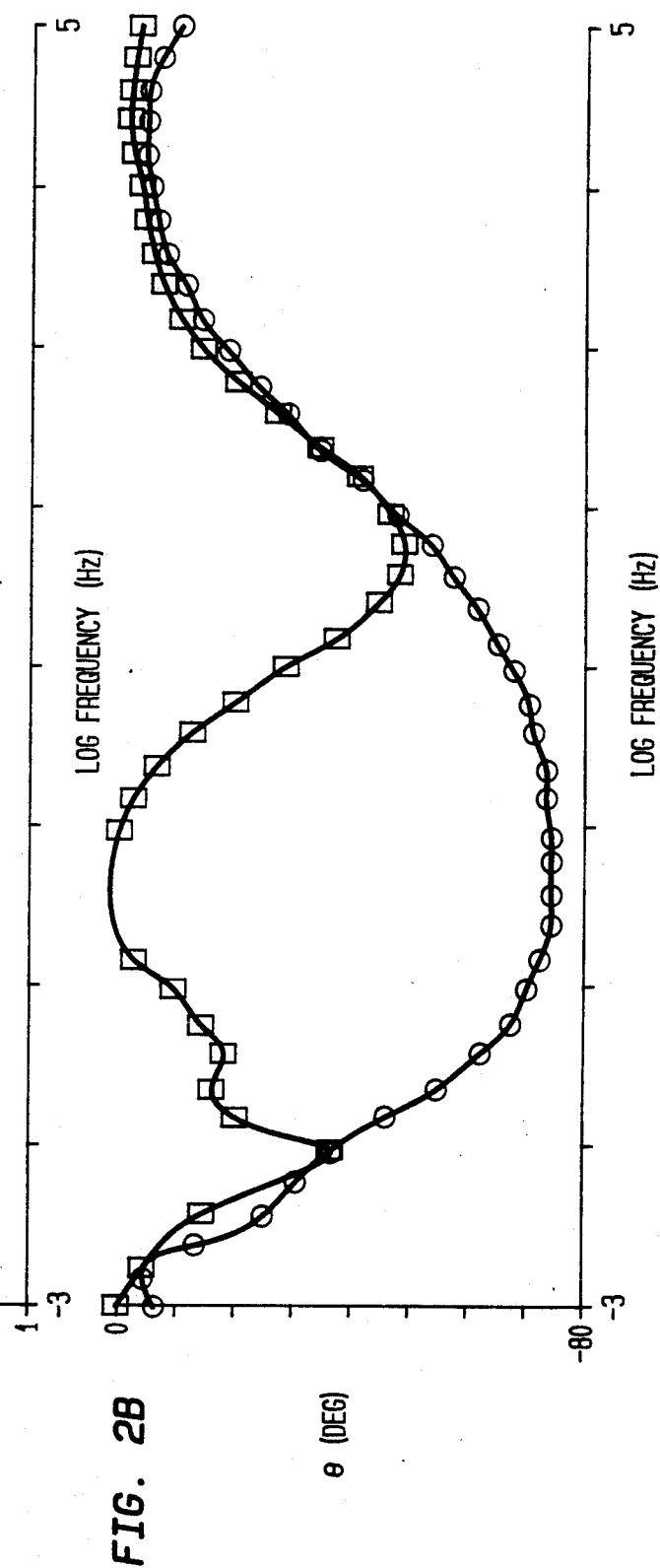

FIG. 2 and FIG. 2B give the Bode plots for 0.128% HDDPA (circles) and 0.2% HEDPA (squares) in BAF2. HEDPA shows 2 time constants which indicates its inability to form a protective film. In fact it is slightly aggressive since its $R_p$ is ~2.6 decades lower than that of HDDPA. There is about a five hundredfold improvement in corrosion inhibition by lengthening R from 1 to 11 carbons.

EXAMPLE 3

Figure 3:
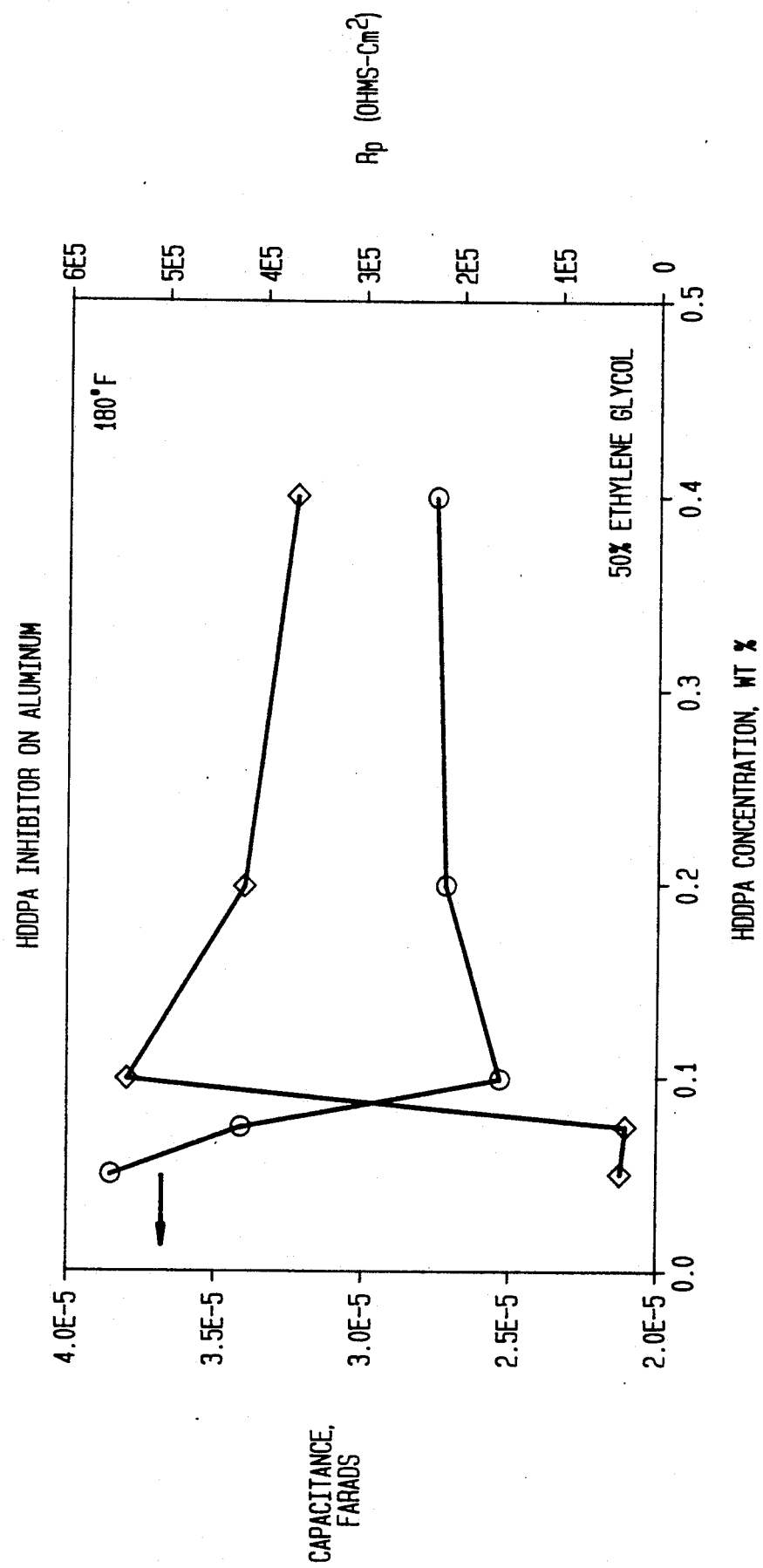
FIG. 3 is a graph of capacitance and Rp as a function of HDDPA concentration in 50% ethylene glycol.

FIG. 3 gives the capacitance and $R_p$ as a function of HDDPA concentration in 50% ethylene glycol (EG). The capacitance drops to a minimum at about 0.1% HDDPA - - - which appears to be the critical hemimicelle concentration ($C_h$) At the $C_h$, the metal surface is completely covered by a monolayer of HDDPA. Since there are two phosphonate groups on the end carbon, at least a bidendate or possibly a tetradentate chelation to the Al oxide surface is feasible. Chelation provides a very strong anchor to the metal surface. (Monophosphonates do not have the right geometry for chelation.) $R_p$ reaches a maximum (lowest corrosion rate) at $C_h$.

Since the diphosphonate ends of the molecules were attached to the metal surface, the alkyl ends must have extended into the solution. To achieve the lowest energy state, the system tries to expose a minimum of alkyl surface to the solution, which lead to a tightly packed monolayer of HDDPA. At the end of the experiment, the exposed area of the electrode looked waxy and the surface was very hydrophobic, in agreement with energy conservation concepts.

EXAMPLE 4

Figure 4:
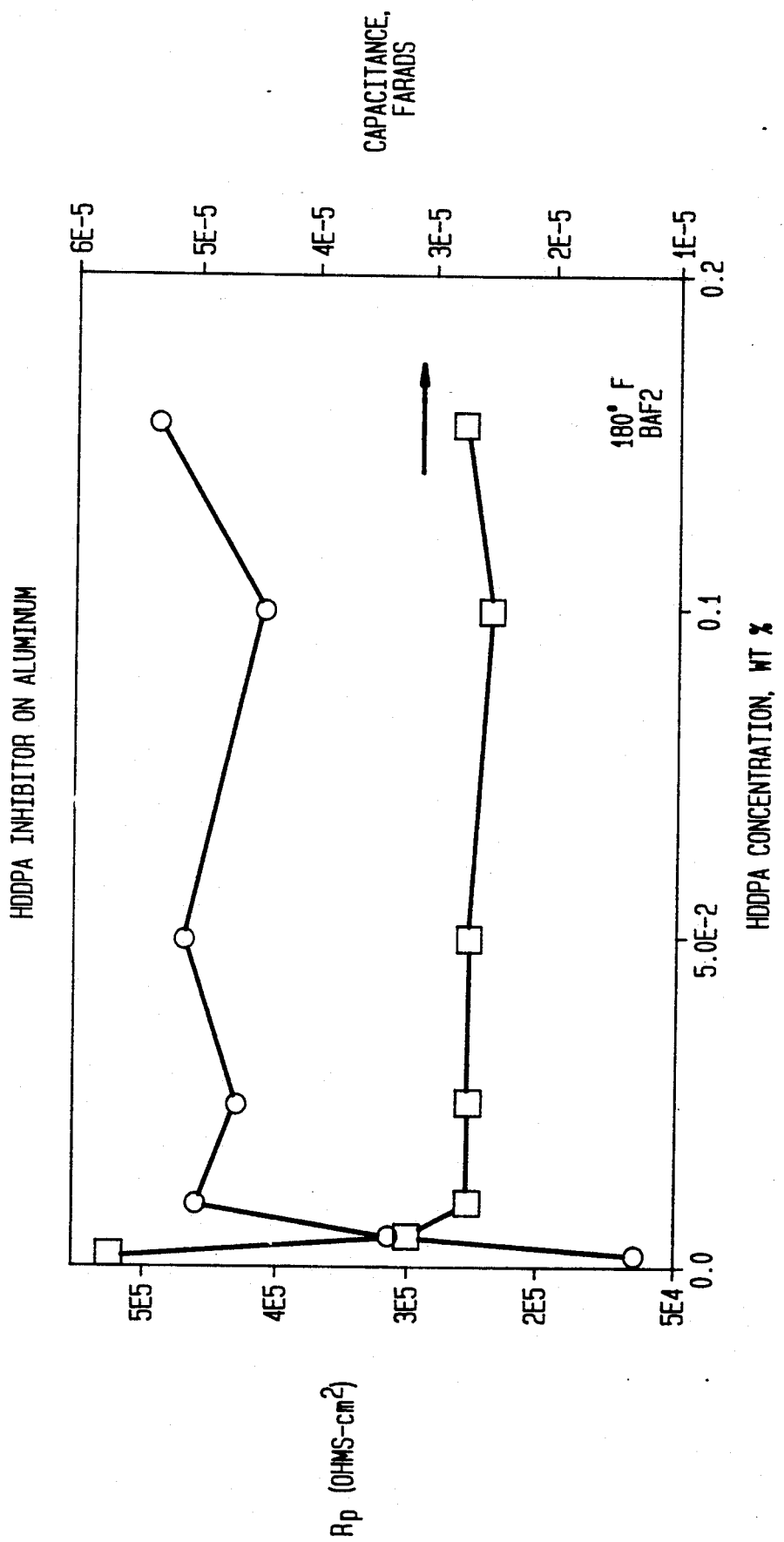
FIG. 4 is a graph of capacitance and Rp of Al as a function of HDDPA concentration in a reference base antifreeze formulation.

FIG. 4 gives the capacitance and $R_p$ of Al as a function of HDDPA concentration in BAF2. The effect of the 0.25% NaNO$_3$ and 0.5% borax was to lower the $C_h$, i.e., fewer number of HDDPA molecules in solution are required to cover the electrode surface. This was probably due to the salting out effect which causes the alkyl chain to coil thereby decreasing its surface area. Since the area of the diphosphonate base is larger than the cross sectional area of the extended alkyl group, in the absence of electrolyte as in the 50% EG, close packing of the alkyl groups would be difficult. The area of the coiled alkyl group is about equal to or slightly larger than the area of the diphosphonate base; therefore, the close-packing of the alkyl can be much more efficient. This is indicated by the higher $R_p$ in BAF2 vs. 50% EG.

EXAMPLE 5

Figure 5:
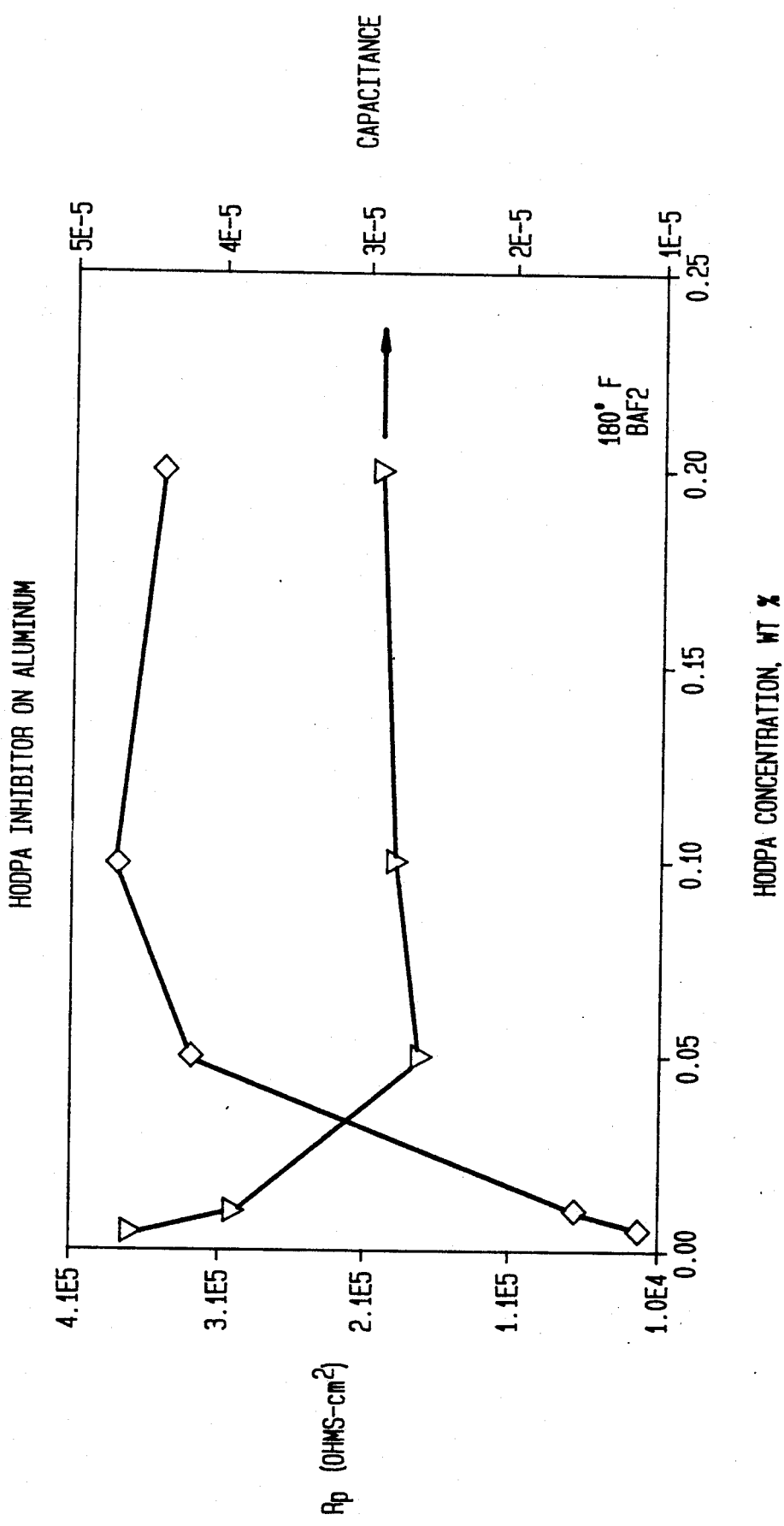
FIG. 5 is a graph of capacitance and Rp of Al as a function of HODPA concentration in a reference base antifreeze formulation.

FIG. 5 gives the capacitance and $R_p$ of Al as a function of HODPA concentration in BAF2. $C_h$ is around 0.05% and the range of $R_p$'s is well over 1E5 ohm-cm$^2$ which makes HODPA a promising inhibitor of Al.

A cursory investigation of the other alloys in the automobile cooling system were carried out using 0.05% HDDPA in BAF2. The results were tabulated below:

| Alloy | $R_p \times 10^5$ | |
|---|---|---|
| | BAF2 | HDDPA/BAF2 |
| Copper | 0.085 | 2.46 |
| Brass | ? | 2.16 |
| Mild Steel | ? | 9.72 |
| Cast Iron | 0.15 | 0.17 |
| Solder | 0.060 | 2.04 |

The experiments for brass and mild steel could not go to completion possibly due to porosity—characteristically, the computer was iterating endlessly and also ranging the potentiostat repeatedly. Therefore, the semicircles could not be obtained with fruitful completion. The addition of HDDPA helped form the semicircles and enabled the completion of the experiment and estimation of $R_p$. The improvement in the corrosion inhibition of copper and solder was very significant, 30-fold and 34-fold respectively. Based on $R_p$, the improvement for cast iron appears very slight; however, it was noted that the crevice corrosion was reduced significantly and the characteristic waxy hydrophobic film was laid down on the surface. This waxy film was observed on all six alloys studied. The uninhibited metals were hydrophilic at the end of the experiments.

The experimental procedures, apparatus and data analysis for Examples 1, 2, 3, 4 and 5 above are outlined in "Use of Electrochemical Noise in the Study of Inhibitor Systems for Aluminum" by S. T. Hirozawa and D. E. Turcotte in *Materials Performance Maintenance— Proceedinos of the International Symposium*, pp. 207–222, Pergammon Press, NY (1991).

While the invention has been described in each of its embodiments, it is to be understood that certain modifications may occur to those skilled in the art without departing from the true spirit and scope of the invention as set forth in the description and accompanying claims.

What is claimed is:

1. A coolant or antifreeze composition effective in inhibiting metal corrosion, comprising about 40–70% of one or more glycols or glycol ethers and about 0.1–0.5% of 1-hydroxyoctylidene-1,1-diphosphonic acid or about 0.01–0.05% of 1-hydroxydodecylidene-1,1-diphosphonic acid.

2. A coolant or antifreeze composition as claimed in claim 1, wherein said glycols and glycol ethers are selected from the group consisting of ethylene glycol, diethylene glycol, propylene glycol, dipropylene glycol, the methyl, ethyl, propyl or butyl ethers of said glycols, and the methyl and ethyl diethers of ethylene glycol, diethylene glycol, or dipropylene glycol, and mixtures thereof.

3. A coolant or antifreeze composition as claimed in claim 2, wherein said glycol is ethylene glycol.

4. A coolant or antifreeze composition as claimed in claim 3, comprising about 40–70% of ethylene glycol, about 0.1–0.5% of 1-hydroxyoctylidene-1,1-diphosphonic acid, and further comprising water.

5. A coolant or antifreeze composition as claimed in claim 3, comprising about 40–70% of ethylene glycol, about 0.01–0.05% of 1-hydroxydodecylidene-1,1-diphosphonic acid, and further comprising water.

6. A coolant or antifreeze composition as claimed in claim 5, comprising about 45–55% ethylene glycol, and about 0.01–0.05% 1-hydroxydodecylidene-1,1-diphosphonic acid.

7. A coolant composition as claimed in claim 5, comprising on a weight basis about 45–55% of ethylene glycol, water, from 0.1–0.25 of 1-hydroxyoctylidene-1,1-diphosphonic acid, and further comprising about 0.1–1% of sodium nitrate and about 0.1–1% of borax 5H$_2$O.

8. A coolant composition as claimed in claim 8, comprising about 50% of ethylene glycol, and about 0.25% sodium nitrate and 0.5% borax . 5H$_2$O.

9. A coolant composition as claimed in claim 7, comprising about 50% ethylene glycol, water, and about 0.02–0.04% of 1-hydroxydodecylidene-1,1-diphosphonic acid.

10. A coolant composition as claimed in claim 9, comprising about 50% ethylene glycol, water, about 0.02–0.04% of hydroxydodecylidene-1,1-diphosphonic acid and about 0.1–1% of one or more coolant additives.

11. A coolant composition as claimed in claim 10, comprising about 0.25% sodium nitrate and about 0.5% of borax . 5H$_2$O.

12. A coolant composition comprising about 40–70% of ethylene glycol, about 0.075–0.5% of 1-hydroxyoctylidene-1,1-diphosphonic acid and further comprising about 0.1–15 of dipotassium phosphate (K$_2$PO$_4$).

13. A coolant composition as claimed i claim 12, comprising about 45–55% of ethylene glycol, about 0.15–02.5% of 1-hydroxyoctylidene-1,2-diphosphonic acid and about 0.25–0.75% of dipotassium phosphate.

14. A method of inhibiting metal corrosion in coolant systems which comprises adding the composition of claim 5 as a corrosion inhibitor.

15. A method of inhibiting metal corrosion in coolant systems which comprises adding the composition of claim 6 as a corrosion inhibitor.

* * * * *